US008463191B2

(12) United States Patent
Farajidana et al.

(10) Patent No.: US 8,463,191 B2
(45) Date of Patent: Jun. 11, 2013

(54) BEAMFORMING OPTIONS WITH PARTIAL CHANNEL KNOWLEDGE

(75) Inventors: Amir Farajidana, Sunnyvale, CA (US); Alexei Gorokhov, San Diego, CA (US); Kapil Bhattad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 12/750,423

(22) Filed: Mar. 30, 2010

(65) Prior Publication Data

US 2010/0255790 A1 Oct. 7, 2010

Related U.S. Application Data

(60) Provisional application No. 61/166,077, filed on Apr. 2, 2009.

(51) Int. Cl.
H04B 1/00 (2006.01)
H04B 15/00 (2006.01)

(52) U.S. Cl.
USPC ............................................. 455/63.4; 455/69

(58) Field of Classification Search
USPC ................ 455/46, 47, 504, 63.4, 66.1, 67.11, 455/69, 101
See application file for complete search history.

(56) References Cited

U.S. PATENT DOCUMENTS

| 6,898,235 | B1 | 5/2005 | Carlin et al. | |
| 7,629,902 | B2* | 12/2009 | Zhang et al. | 341/106 |
| 2009/0046570 | A1* | 2/2009 | Sarkar et al. | 370/203 |

FOREIGN PATENT DOCUMENTS

| EP | 1304812 | 4/2003 |
| GB | 2412997 | 10/2005 |
| WO | WO2005076847 | 8/2005 |

OTHER PUBLICATIONS

International Search Report and Written Opinion—PCT/US2010/029507, International Searching Authority—European Patent Office—Jul. 14, 2010.

* cited by examiner

*Primary Examiner* — Ping Hsieh
(74) *Attorney, Agent, or Firm* — Kenyon S. Jenckes

(57) ABSTRACT

A method for transmission beamforming is disclosed. One or more channel knowledge metrics are obtained for one or more channels. A confidence level of each channel knowledge metric is determined. Beamforming specifications are selected based on the channel knowledge metrics and the confidence levels. A signal stream is transmitted on the one or more channels using the selected beamforming specifications.

53 Claims, 12 Drawing Sheets

BEAMFORMING OPTIONS WITH PARTIAL CHANNEL KNOWLEDGE

RELATED APPLICATIONS

This application is related to and claims priority from U.S. Provisional Patent Application Ser. No. 61/166,077, entitled "BEAMFORMING OPTIONS WITH PARTIAL CHANNEL KNOWLEDGE," filed on Apr. 2, 2009, which is expressly incorporated by reference herein in its entirety.

TECHNICAL FIELD

The present disclosure relates generally to communication systems. More specifically, the present disclosure relates to systems and methods for transmission beamforming techniques.

BACKGROUND

Wireless communication systems are widely deployed to provide various types of communication content such as voice, video, data, and so on. These systems may be multiple-access systems capable of supporting simultaneous communication of multiple terminals with one or more base stations.

A problem that must be dealt with in all communication systems is fading or other interference. There may be problems with decoding the signals received. One way to deal with these problems is by utilizing beamforming. With beamforming, instead of using each transmit antenna to transmit a spatial stream, the transmit antennas each transmit a linear combination of the spatial streams, with the combination being chosen so as to optimize the response at the receiver.

Smart antennas are arrays of antenna elements, each of which receive a signal to be transmitted with a predetermined phase offset and relative gain. The net effect of the array is to direct a (transmit or receive) beam in a predetermined direction. The beam is steered by controlling the phase and gain relationships of the signals that excite the elements of the array. Thus, smart antennas direct a beam to each individual mobile unit (or multiple mobile units) as opposed to radiating energy to all mobile units within a predetermined coverage area (e.g., 120°) as conventional antennas typically do. Smart antennas increase system capacity by decreasing the width of the beam directed at each mobile unit and thereby decreasing interference between mobile units. Such reductions in interference result in increases in signal-to-interference and signal-to-noise ratios that improved performance and/or capacity. In power controlled systems, directing narrow beam signals at each mobile unit also results in a reduction in the transmit power required to provide a given level of performance.

Wireless communication systems may use beamforming to provide system-wide gains. In beamforming, multiple antennas on the transmitter may steer the direction of transmissions towards multiple antennas on the receiver. Beamforming may reduce the signal-to-noise ratio (SNR). Beamforming may also decrease the amount of interference received by terminals in neighboring cells. Benefits may be realized by providing improved beamforming techniques.

DETAILED DESCRIPTION

Figure 1:
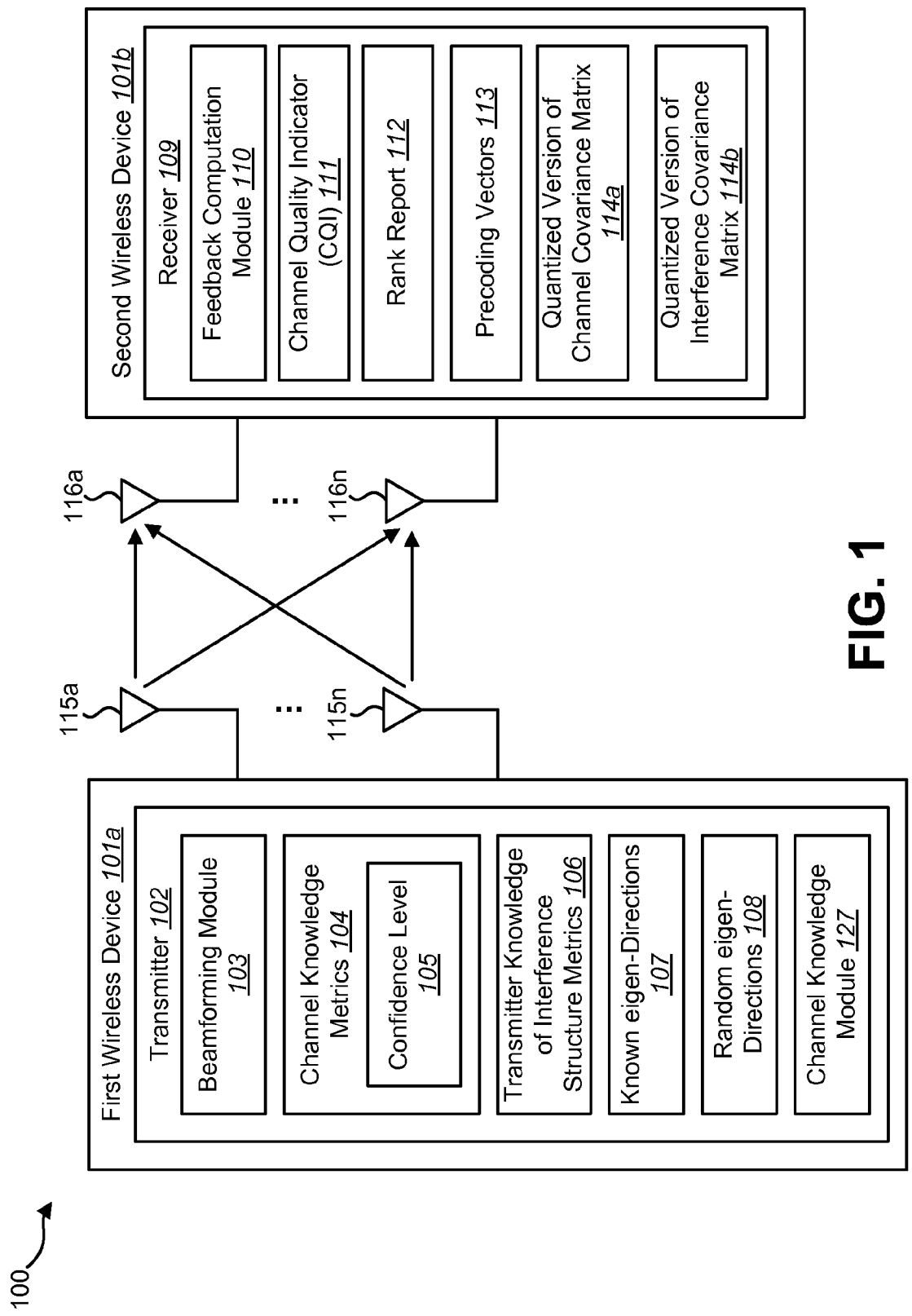
FIG. 1 shows a wireless communication system with multiple wireless devices.

A method for transmission beamforming is described. One or more channel knowledge metrics are obtained for one or more channels. A confidence level of each channel knowledge metric is determined. Beamforming specifications are selected based on the channel knowledge metrics and the confidence levels. A signal stream is transmitted on the one or more channels using the selected beamforming specifications.

One or more known eigen-directions may be selected using the one or more channel knowledge metrics and the confidence levels. Parts of the one or more channels not observable or estimable may be determined. Random values may be selected for the determined parts. The random values selected may be orthogonal to the known eigen-directions. The eigen-directions and the random values may be the beamforming specifications. The random values may be selected using a conditional probability distribution and a joint probability distribution that reflect the channel properties.

Transmitting the signal stream may include transmitting different signal stream layers in directions corresponding to the known eigen-direction and the random values. Obtaining the one or more channel knowledge metrics may include receiving feedback from a receiver and using the feedback to obtain the one or more channel knowledge metrics. The feedback may include one or more precoding vectors, a quantized version of a channel covariance matrix and channel quality indicators (CQI) and rank and may be based on a pseudo eigen-beamforming operation synchronized between a base station and a wireless communication device. The feedback may also include a quantized version of an interference covariance matrix and eigen-directions of a whitened channel computed using interference. The channel quality indicators (CQI) and rank may also be based on a pseudo eigen-beamforming operation with random beamforming that is not known by a base station. The base station may transmit along a set of random beams in the orthogonal space of known eigen-directions in addition to the eigen-directions using the CQI and rank recommended.

The one or more channel knowledge metrics may be obtained using long term static observations. The long term static observations may include at least one of a number of transmit antennas used, an antenna spacing on a transmitter, a number of receive antennas used, an antenna spacing on a receiver and a type of antenna used. The one or more channel knowledge metrics may be obtained using receiver-to-transmitter traffic. The receiver-to-transmitter traffic may include sounding reference signal (SRS) transmissions and/or a channel/interference covariance matrix structure. The beamforming specifications may be selected at a transmitter using knowledge of interference structure metric. The transmitter knowledge of interference structure metric may include a long term covariance matrix of interference and/or dominant eigen-directions of interference.

Obtaining the one or more channel knowledge metrics includes receiving a sounding reference signal (SRS) from a receiver and determining one or more channel knowledge metrics using the SRS. The beamforming specifications may include a group or groups of antennas to use for transmitting the signal stream, weights assigned to one or more transmit antennas used for transmitting the signal stream and/or weights assigned to each symbol of the signal stream.

The method may be performed by a wireless device. The wireless device may be a base station or a wireless communication device. The wireless device may be configured to operate in a multiple-input and multiple-output (MIMO) wireless communication system.

A wireless device configured for transmission beamforming is also described. The wireless device includes a processor, memory in electronic communication with the processor, and instructions stored in the memory. The instructions are executable by the processor to obtain one or more channel knowledge metrics for one or more channels, determine a confidence level of each channel knowledge metric, select beamforming specifications based on the channel knowledge metrics and the confidence levels and transmit a signal stream on the one or more channels using the selected beamforming specifications.

A wireless device configured for transmission beamforming is described. The wireless device includes means for obtaining one or more channel knowledge metrics for one or more channels, means for determining a confidence level of each channel knowledge metric, means for selecting beamforming specifications based on the channel knowledge metrics and the confidence levels and means for transmitting a signal stream on the one or more channels using the selected beamforming specifications.

A computer-program product for a wireless device configured for transmission beamforming is also disclosed. The computer-program product includes a computer-readable medium having instructions thereon. The instructions include code for obtaining one or more channel knowledge metrics for one or more channels, code for determining a confidence level of each channel knowledge metric, code for selecting beamforming specifications based on the channel knowledge metrics and the confidence levels and code for transmitting a signal stream on the one or more channels using the selected beamforming specifications.

FIG. 1 shows a wireless communication system 100 with multiple wireless devices 101. Wireless communication systems 100 are widely deployed to provide various types of communication content such as voice, data, and so on. These systems may be multiple-access systems capable of supporting communication with multiple users by sharing the available system resources (e.g., bandwidth and transmit power). A wireless device 101 may be a base station, a wireless communication device, a controller, or the like. The wireless communication system 100 may include a first wireless device 101a and a second wireless device 101b. The first wireless device 101a may be a transmitting wireless device while the second wireless 101b device is a receiving wireless device.

Communications between the first wireless device 101a and the second wireless device 101b in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) 102 and receiver(s) 109 equipped, respectively, with multiple (NT) transmit antennas 115a-n and multiple (NR) receive antennas 116a-n for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The wireless communication system 100 may utilize MIMO. At the transmitter 102, each portion of a data stream may be transmitted from a different antenna 115. At the receiver 109, the different portions of the data stream may be received by different antennas 116 and then combined. A MIMO channel formed by the NT transmit and NR receive antennas may be decomposed into one or more independent channels, which are also referred to as spatial channels; each of the independent channels corresponds to a dimension. The number of independent channels will be referred to as NS.

A MIMO system may support both time division duplex (TDD) and frequency division duplex (FDD) systems. In a TDD system, forward and reverse link transmissions are on the same frequency region so that the reciprocity principle allows the estimation of the forward link channel from the reverse link channel. This enables a transmitting wireless device (i.e., the first wireless device 101a) to extract transmit beamforming gain from communications received by the transmitting wireless device.

The wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, Third Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project"

(3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA) systems utilize single carrier modulation and frequency domain equalization. An SC-FDMA system has similar performance and essentially the same overall complexity as those of an OFDMA system. An SC-FDMA signal has lower peak-to-average power ratio (PAPR) because of its inherent single carrier structure. SC-FDMA has drawn great attention, especially in uplink communications where lower PAPR greatly benefits the mobile terminal in terms of transmit power efficiency. It is currently a working assumption for uplink multiple access scheme in 3GPP Long Term Evolution (LTE), or Evolved UTRA.

The first wireless device 101a may include a transmitter 102. The transmitter 102 may include a beamforming module 103. Beamforming may refer to the use of multiple antennas to adjust the direction of transmission and/or reception of wireless signals. Beamforming may improve the signal-to-noise ratio (SNR). Beamforming may also reduce the interference to wireless devices in neighboring cells. In one configuration, the beamforming module 103 may be used for pseudo-eigen beamforming (PeB). PeB is discussed in further detail below in relation to FIG. 4. In PeB, random values may be assumed for the parts of the channel that are neither observable nor estimable based on the knowledge available at the transmitter 102. The efficiency of beamforming may depend on the amount of knowledge a transmitter 102 has of the channel between the transmitter 102 and a receiver 109. More channel knowledge may mean better beamforming techniques.

PeB may be used with multiple codeword or single codeword MIMO operation. In order to reduce the overhead of acknowledgments and also provide more robustness across the codewords, layer shifting and/or single codeword operation may be enforced when PeB is used. Each stream (or codeword) refers to a set of bits encoded together. Different streams may have different encoders. Also, corresponding to each codeword, streams may have independent ACK/NACK feedback from the receiver 109 to the transmitter 102. Each stream is mapped into a number of spatial layers, where each layer corresponds to a beam direction. For instance, a 4×4 MIMO system may have a transmission with two codewords (streams), where each codeword is mapped to two beam directions or layers. Layer shifting refers to the case when the mapping between streams and spatial layers (beam directions) are permuted across different subcarriers. The mode decision may depend on the rank of transmission and the amount of channel knowledge. Thus, the mode decision may depend on the reliability of the beamforming. In layer shifting mode, all codewords see similar channel conditions. Hence, the CQI feedback for both layers may be identical and the ACK/NACK information may be correlated for several receiver implementations such as minimum mean square error (MMSE), making it possible to reduce ACK and CQI overhead.

Transmitter 102 side beamforming can provide system-wide gains by having the transmitter 102 exploit knowledge of the channel between the transmitter 102 and a receiver 109 to select appropriate spatial directionality of the transmitted signal. Knowledge of a channel may be referred to as a channel knowledge metric 104. A transmitter 102 may include one or more channel knowledge metrics 104. Each channel knowledge metric 104 may refer to a different piece of data regarding the channel. For example, a channel knowledge metric 104 may refer to the known geometry of transmitting antennas 115. Each channel knowledge metric 104 may have an associated confidence level 105. The transmitter 102 can also use one or more transmitter knowledge of interference structure metrics 106 to determine beamforming Knowledge of interference structure metrics 106 may refer to the spatial structure of the interference and also the strength, which can be used to improve user experience. For instance, if it is known that the structure of the interference is such that it shows a rank 1 dominant interferer (transmission), then beamforming can be done in a direction to avoid the dominant rank 1 direction of the interference.

The transmitter 102 may also include transmissions along known eigen-directions 107. The known eigen-directions 107 may be obtained via the channel knowledge metrics 104. A known eigen-direction 107 may refer to the eigen-directions of a channel that are eigen-vectors of the channel covariance matrix. The eigen beams are beam directions that are orthogonal to each other such that transmissions along the eigen-directions decouples the MIMO channel between the transmitter 102 and the receiver 109 into orthogonal scalar channels. Although eigen-directions 107 are mentioned throughout, other beam directions may also be used such as beam directions selected using available channel knowledge that maximizes the expected sum rate.

In general, beamforming may be accomplished by transmitting different layers in directions corresponding to the eigen-directions of the channel. If information of the interference is available, the transmissions may happen in the eigen-directions of the whitened channel. The known eigen-directions 107 may be obtained by computing the covariance matrix of the channel and/or the interference over a frequency-time period. If there are more spatial dimensions between the first wireless device 101a and the second wireless device 101b than the number of known eigen-directions 107, the transmitter 102 may also use random eigen-directions 108 in transmission. The random eigen-directions 108 may refer to the random values assigned to parts of the channel in PeB. The random eigen-directions 108 may be orthogonal to the subspace spanned by the known eigen-directions 107. The transmitter 102 may include a channel knowledge module 127. The transmitter 102 may use the channel knowledge module 127 to determine the channel knowledge metrics 104. The channel knowledge module 127 is discussed in additional detail below in relation to FIG. 4.

A second wireless device 101b may receive transmissions from the first wireless device 101a using one or more receive antennas 116a-n. The second wireless device 101b may include a receiver 109. The second wireless device 101b may only use a subset of the receive antennas 116 for transmissions. In this case, using reciprocity, the first wireless device 101a can only obtain channel knowledge for the subset of receive antennas 116 that are also used as transmitters by the second wireless device 101b.

The receiver 109 may include a feedback computation module 110. The feedback computation module 110 may be used by the receiver 109 to determine what feedback should be sent to the first wireless device 101a. The feedback computation module 110 may generate channel quality indicators (CQI) 111 and a rank report 112. The channel quality indicators (CQI) 111 may refer to channel estimates made by the receiver 109. The rank report 112 may include the recommended number of beams that should be used by the transmitter 102. The relative confidence levels for the channel quality indicators (CQI) 111 and rank report 112 may be fed back to the first wireless device 101a. The feedback computation module 110 may also convey information regarding channel directionality (spatial properties of the channel), generate precoding vectors 113, generate a quantized version of the channel covariance matrix 114a and generate a quantized version of the interference covariance matrix 114b.

The channel quality indicators (CQI) 111 and the rank report 112 may be based on the pseudo-eigen beamforming mechanism that will be used by the transmitter 102 on the first wireless device 101a. Both the channel quality indicators (CQI) 111 and the rank report 112 may be adaptive. The second wireless device 101b may consider a different rank hypothesis in pseudo-eigen beamforming and select the rank from the rank report 112 and corresponding channel quality indicator (CQI) 111 that maximizes some desirable criteria such as the spectral efficiency. In selecting the rank and channel quality indicators (CQI) 111 to be reported, the receiver 109 may take into account robustness and different levels of confidence in the results for different ranks. Rank refers to the number of spatial layers multiplexed and transmitted together. Confidence level 105 is a quantitative/qualitative measure of the accuracy of channel knowledge coming from different sources (e.g., reciprocity and feedback). A transmission with rank 2 (or two layers) may require knowledge of the channel that is more accurate, but as the rank of transmission increases, the uncertainty also increases. The tradeoff between accuracy and uncertainty may be considered. The knowledge available at both the transmitter 102 and the receiver 109 may be more conclusive for a rank 1 transmission than for a rank 2 transmission. The randomness and the associated structure assumed in beam construction may be coordinated between the transmitter 102 and the receiver 109.

The second wireless device 101b may report information about assumed beamforming operation explicitly. For example, the channel from some or all of the unobserved receive antennas 116 may be quantized and fed back to the transmitter 102 along with the channel quality indicators (CQI) 111 and rank report 112. The receiver 109 may also perform the beamforming for more than one stream. The receiver 109 may choose one or more of the possible precoding vectors 113 as one beam direction along which transmissions will happen. The choice of these precoding vectors 113 may then be fed back to the transmitter 102. The receiver 109 may assume multiplexing of other layers sent in directions random (possibly over a defined set) and orthogonal to the subspace spanned by the originally chosen precoding vectors 113.

The transmitter 102 may partially use the information fed back from the second wireless device 101b and compute or adjust some of the parameters based on all the knowledge available. For example, the transmitter 102 may override the rank report 112 and adjust the channel quality indicators (CQI) 111 accordingly. In one configuration, the receiver 109 may only feed back the channel quality indicators (CQI) 111. The transmitter 102 may then compute the rank based on the available knowledge.

Figure 2:
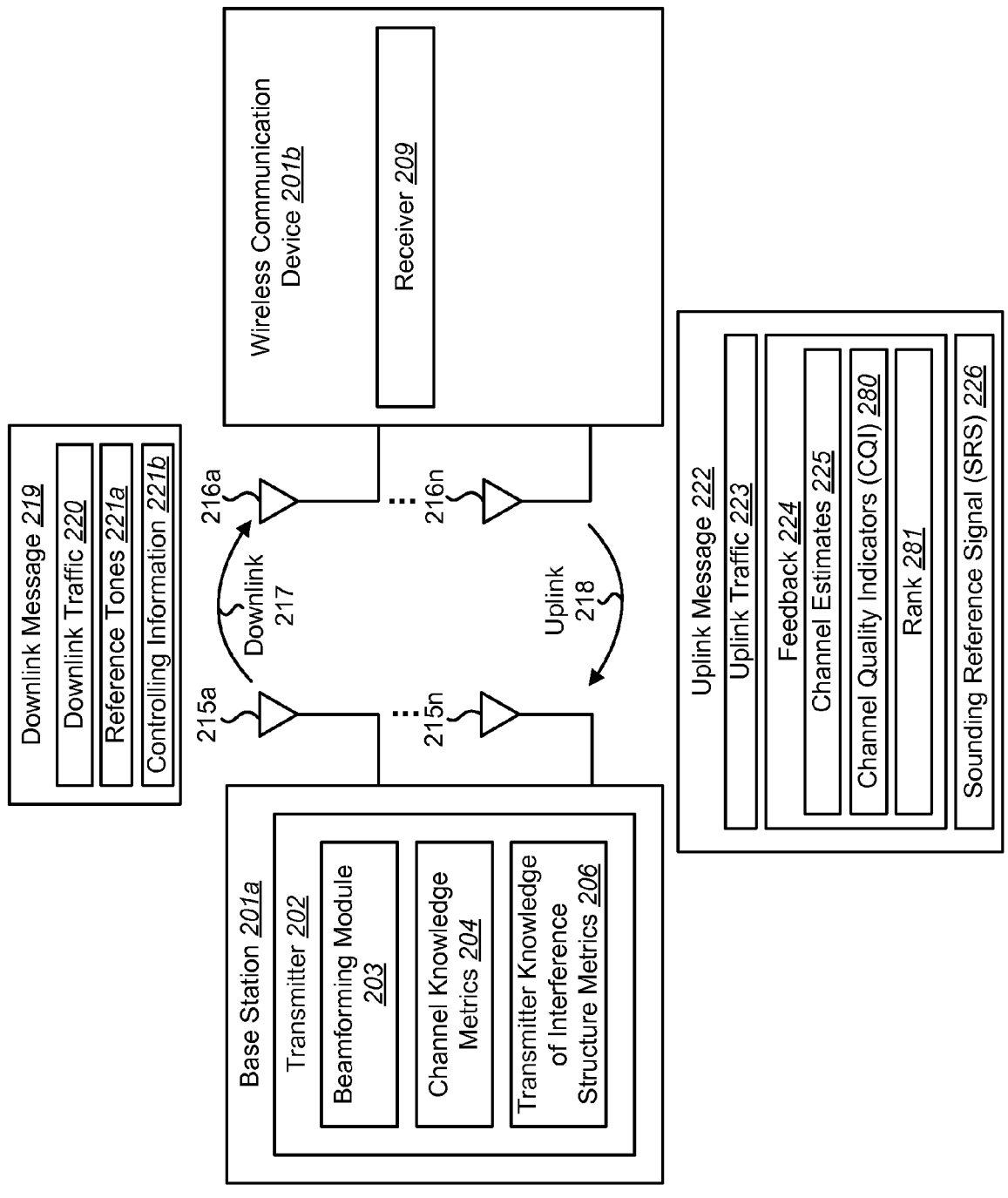
FIG. 2 shows another wireless communication system with multiple wireless devices.

FIG. 2 shows another wireless communication system 200 with multiple wireless devices 201. A wireless device 201 may be a base station 201a or a wireless communication device 201b. A base station 201a is a station that communicates with one or more wireless communication devices 201b. A base station 201a may also be referred to as, and may include some or all of the functionality of, an access point, a broadcast transmitter, a Node B, an evolved Node B, etc. The term "Base Station" will be used herein. Each base station 201a provides communication coverage for a particular geographic area. A base station 201a may provide communication coverage for one or more wireless communication devices 201b. The term "cell" can refer to a base station 201a and/or its coverage area depending on the context in which the term is used.

A wireless communication device 201b may also be referred to as, and may include some or all of the functionality of, a terminal, an access terminal, a user equipment (UE), a subscriber unit, a station, etc. A wireless communication device 201b may be a cellular phone, a personal digital assistant (PDA), a wireless device, a wireless modem, a handheld device, a laptop computer, etc. A wireless communication device 201b may communicate with zero, one, or multiple base stations 201a on the downlink 217 and/or uplink 218 at any given moment. The downlink 217 (or forward link) refers to the communication link from a base station 201a to a wireless communication device 201b, and the uplink 218 (or reverse link) refers to the communication link from a wireless communication device 201b to a base station 201a.

The base station 201a of FIG. 2 may be one configuration of the first wireless device 101a of FIG. 1. The base station 201a may include a transmitter 202. The transmitter 202 may include a beamforming module 203, channel knowledge metrics 204, and transmitter knowledge of interference structure metrics 206.

The base station 201a may send a downlink message 219 via one or more antennas 215a-n. The downlink message 219 may include downlink traffic 220. The downlink message 219 may also include reference tones 221a. The downlink message 219 may further include control information 221b.

The wireless communication device 201b may receive a downlink message 219 transmitted by the base station 201a. The wireless communication device 201b may receive the downlink message 219 over the downlink channel 217 using one or more receive antennas 216a-n. The wireless communication device 201b may use a receiver 209 to receive and decode the downlink message 219. The wireless communication device 201b may then send uplink messages 222 to the base station 201b. An uplink message 222 may be transmitted via the uplink channel 218. An uplink message 222 may include uplink traffic 223. An uplink message 222 may also include feedback 224. The feedback 224 may include channel estimates 225 related to the downlink channel 217 from the base station 201a to the wireless communication device 201b. Channel estimates 225 obtained via feedback 224 are discussed in additional detail below in relation to FIG. 4. In PeB, the feedback 224 may include channel quality indicators (CQI) 280 and rank 281. The channel quality indicators (CQI) 280 and rank 281 may be based on a synchronized PeB operation at the wireless communication device 201b and the base station 201a. Thus, the beam-directions, channel quality indicators (CQI) 280 and rank 281 may be computed based on a PeB scheme known by both the transmitter 202 and the receiver 209. An uplink message 222 may further include a sounding reference signal (SRS) 226.

The base station 201a may use the channel quality indicators (CQI) 280 and rank 281 for the transmission of data and modulation. The base station 201a may also use the channel quality indicators (CQI) 280 and rank 281 for modulation and coding scheme (MCS) selection and to select the appropriate number of layers. In one configuration, the channel quality indicators (CQI) 280 and the rank 281 may be based on a random beamforming PeB operation of the wireless communication device 201b that utilizes channel information available at the transmitter 202 to generate the known direction. The random directions may or may not be synchronized with the base station 201a. The receiver may utilize channel information that is not known by the base station 201a to determine CQI and rank. The base station 201a may then use another set of random beams in the orthogonal space of known directions and transmit along those random beams in addition to the known directions using the channel quality indicators (CQI) 280 and rank 281 recommended.

The wireless communication system 200 may be a time division duplex (TDD) system. In a TDD system, transmissions from the base station 201a to the wireless communication device 201b and transmissions from the wireless communication device 201b to the base station 201a may happen in the same frequency band. Because of the reciprocity of the uplink channel 218 and downlink channel 217, the base station 201a may be able to acquire an estimate of the downlink channel 217 through the sounding reference signal (SRS) 226 transmitted by the wireless communication device 201b to the base station 201a via the uplink channel 218 and an uplink message 222.

In one configuration, the antennas utilized by the wireless communication device 201b to transmit may be a subset of the antennas 216 used to receive signals on the wireless communication device 201b. In the wireless communication device 201b, some of the receiver antennas 216 for the downlink 217 may also be transmitter antennas for the uplink 218. The base station 201a may only gain a partial knowledge of the downlink channel 217 using reciprocity. Specifically, partial channel reciprocity may occur when not all the receiver antennas 216 for downlink 217 are used in the uplink 218 for sounding reference signal (SRS) 226 transmission.

Sending the sounding reference signal (SRS) 226 on the uplink 218 from a subset of antennas 216 that are used for receiving the downlink 217 may result in only partial channel knowledge at the base station 201a. If the feedback 224 is based on reference signals (which may possibly be common to all wireless communication devices 201b) corresponding to only a subset of transmit antennas 215, only partial channel knowledge may be obtained through feedback 224 from the wireless communication device 201b. As an example, consider an 8×4 MIMO system with eight antennas at the base station 201a and four antennas 216 at the wireless communication device 201b. If only two reference signals 221a corresponding to the first two transmit antennas 215 are transmitted, the base station 201a may gain partial knowledge of the 8×4 channel (only for a 2×4 submatrix corresponding to the two antennas 215 that the reference signal is transmitted from) through feedback 224 based on the transmitted reference signals 221a.

In LTE Release 8, antenna switching of the sounding reference signal (SRS) 226 is possible. However, it is not a mandatory feature and may be undesirable in some wireless communication device 201b implementations. For example, antenna switching of the sounding reference signal (SRS) 226 may introduce an insertion loss. By using antenna switching of the sounding reference signal (SRS) 226, the base station 201a may obtain knowledge of the downlink channel 217 for all of the receive antennas 216 used by the wireless communication device 201b.

Figure 3:
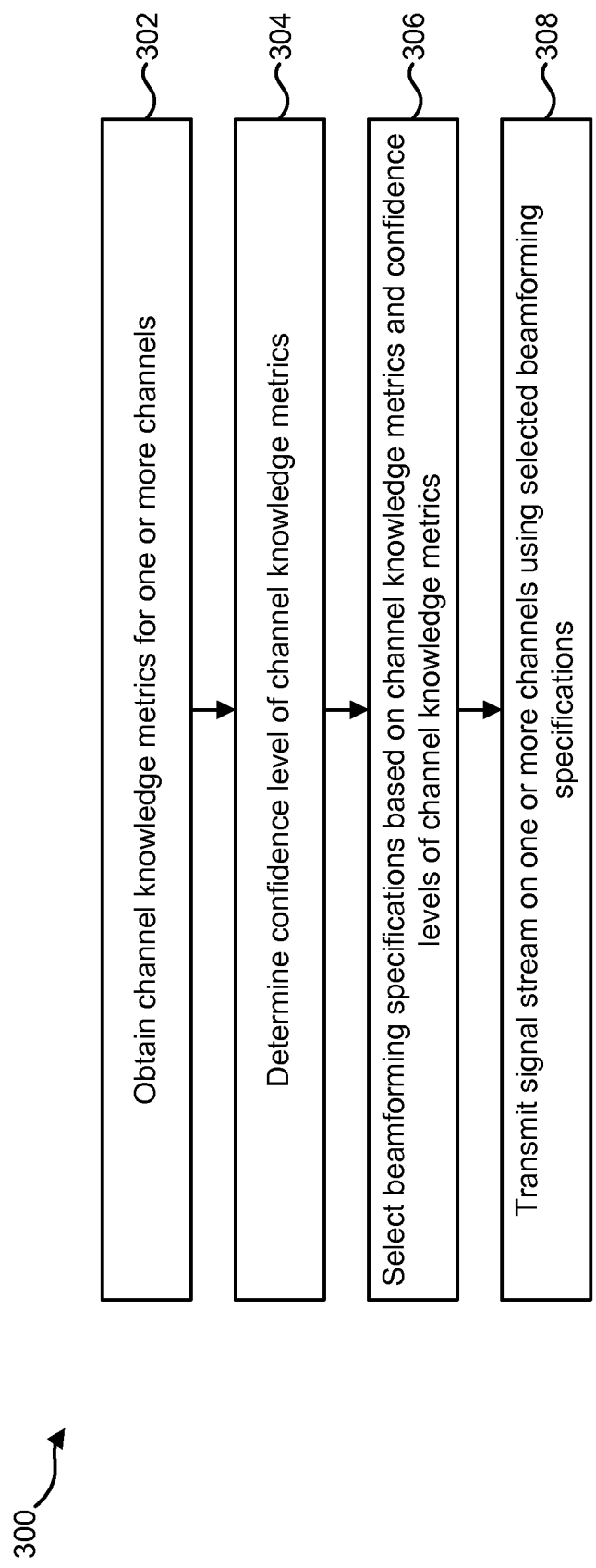
FIG. 3 is a flow diagram of a method for beamforming with partial channel knowledge.

FIG. 3 is a flow diagram of a method 300 for beamforming with partial channel knowledge. The method 300 may be performed by a first wireless device 101a. The first wireless device 101a may obtain 302 channel knowledge metrics 104 for one or more channels. The channel knowledge metrics 104 may each describe some aspect of the channel from the first wireless communication device 101a to a second wireless communication device 101b. For example, channel knowledge metrics 104 may describe the known interference between the first wireless device 101a and the second wireless device 101b, the minimum gain necessary, and the preferred direction of transmission.

The first wireless device 101a may determine 304 a confidence level 105 of each channel knowledge metric 104. The confidence level 105 may correspond to how accurate each channel knowledge metric 104 is believed to be. For example, a channel knowledge metric 104 corresponding to the receive antennas 216 used by the second wireless device 101b may be more accurate than a channel knowledge metric 104 corresponding to a sounding reference signal (SRS) 226. The confidence level 105 may also correspond to the level of importance of each channel knowledge metric 104. For example, a channel estimate 225 received from a wireless device via feedback 224 may provide more knowledge of the channel and interference than a sounding reference signal (SRS) 226.

The first wireless device 101a may select 306 beamforming specifications based on the channel knowledge metrics 104 and the confidence levels 105 of the channel knowledge metrics 104. Beamforming specifications may include the number of transmit antennas 115 used, the groups of transmit antennas 115 used, the number of spatial layers, the weight assigned to each transmit antenna 115, a phase shift assigned to each transmit antenna 115, the weight assigned to each spatial layer and the phase shift assigned to each spatial layer. Each group of antennas and/or the area in which they are designed to communicate is often referred to as a sector. Beamforming specifications may include transmitting different layers of the signal stream in directions corresponding to the eigen-directions of the channel. Apart from using the eigen-directions of the channel as the beam directions, precoding vectors from a given set that maximizes the sum-capacity or possibly other metrics using those precoding vectors may be used. In those scenarios, the beam directions may not be eigen-directions of the channel or the whitened channel. The first wireless device 101a may then transmit 308 the signal stream on one or more channels using the selected beamforming specifications.

Figure 4:
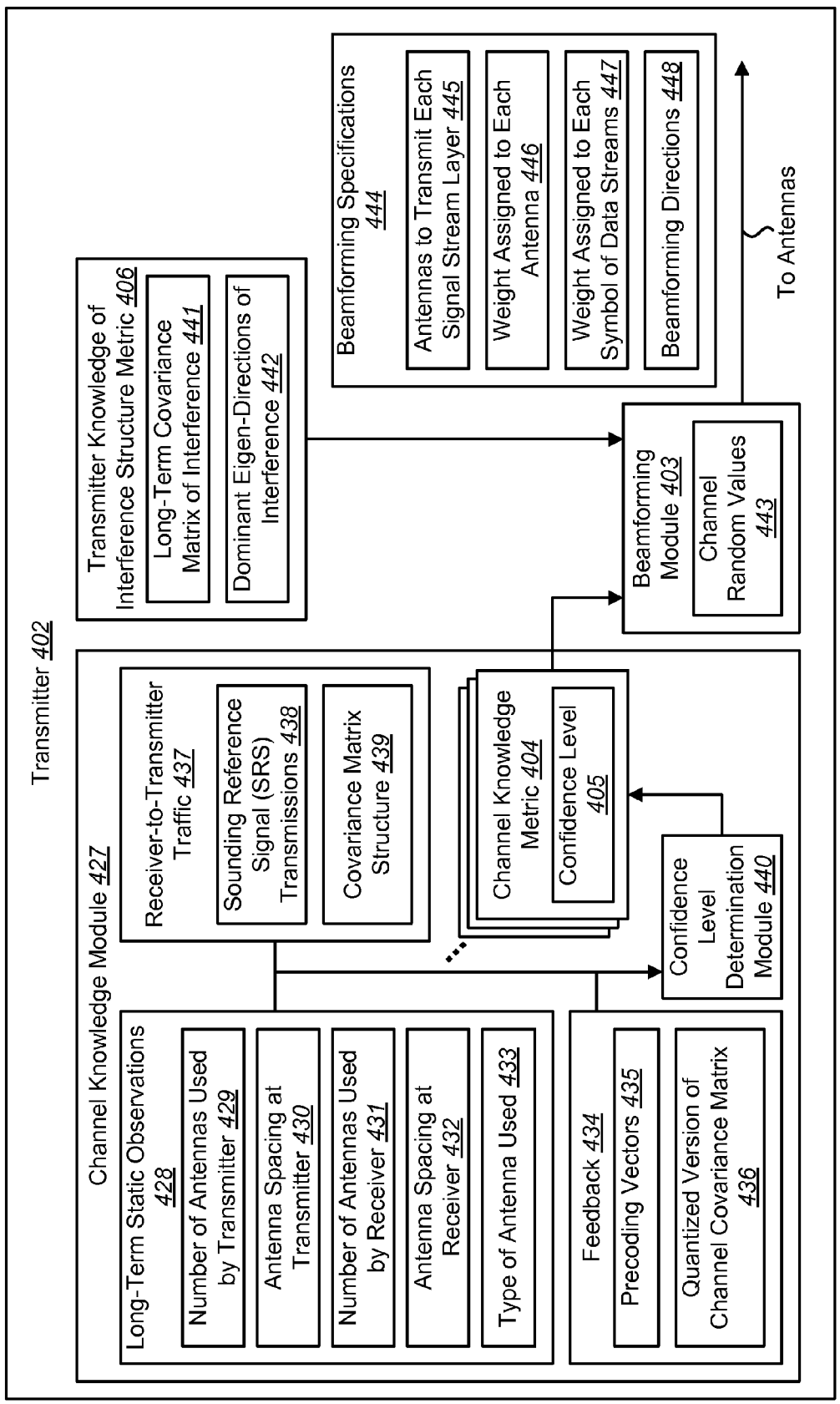
FIG. 4 is a block diagram illustrating a transmitter for use in the present systems and methods.

FIG. 4 is a block diagram illustrating a transmitter 402 for use in the present systems and methods. The transmitter 402 of FIG. 4 may be one configuration of the transmitter 102 of FIG. 1. The transmitter 402 may be located on a first wireless device 101a. The transmitter 402 may include a channel knowledge module 427. The channel knowledge module 427 of FIG. 4 may be one configuration of the channel knowledge module 127 of FIG. 1. The channel knowledge module 427 may be used to determine one or more channel knowledge metrics 404. The channel knowledge module 427 may obtain channel knowledge from long term static observations 428, feedback 434, and receiver-to-transmitter traffic 437.

Long term static observations 428 may be made by the transmitter 402. Long term static observations 428 may depend on the structure of the transmitter 402, the structure of the receiver 109, and the geometry of the antenna configurations used by the transmitter 402 and the receiver 109. Long term static observations 428 may include the number of antennas used by the transmitter 429, the antenna spacing at the transmitter 430, the number of antennas used by the receiver 431, the antenna spacing at the receiver 432 and the type of antennas used 433. Examples of the type of antennas used 433 include cross polarized antennas, closely spaced uniform antenna arrays, and different kinds of antenna placements.

Feedback 434 may be explicitly received from the receiver 109 on the second wireless device 101b. Feedback 434 may include precoding vectors 435 and quantized versions of the channel covariance matrix 436. The feedback 434 may be obtained by channel estimates made by the receiver 109 on the second wireless device 101b. The channel estimates may be based upon reference signals provided by the first wireless device 101a to the second wireless device 101b. The reference signals may include reference signals provided for the purpose of the feedback (such as the CSI-RS concept in LTE-A Release 10 or an SRS transmission), reference signals provided for the purpose of the demodulation and feedback (such as common reference signals in LTE Release 8), and/or User specific reference signals provided for demodulation purposes (DRS in Release 8, UE-RS in Releases 9 and 10). Reference signals and reference tones 221a may be used interchangeably.

The receiver 109 may be able to estimate only part of the entire channel between the physical antennas 115 at the transmitter 402 and the physical antennas 116 at the receiver 109. This may be the case in LTE Release 8 downlink designs, where channel estimates are based on CRS. The number of CRS ports can be four at the most. In this case, the receiver 109 can only estimate the channel for the CRS ports.

Receiver-to-transmitter traffic 437 may be received. The receiver-to-transmitter traffic 437 may include normal data transmissions, such as uplink 218 or downlink 217 traffic. The receiver-to-transmitter traffic 437 may also include sounding reference signal (SRS) transmissions 438. It may be possible for the transmitter 402 to obtain long-term channel information, such as the covariance matrix structure 439, by considering the signal received from the receiver 109. The long-term channel information may be especially useful in time division duplexing (TDD). Adjustments by the transmitter 402 can be made to account for operation in different carrier frequencies and other mismatches.

The channel knowledge module 427 may include a confidence level determination module 440. The confidence level determination module 440 may receive the long term static observations 428, the receiver-to-transmitter traffic 437, and the feedback 434. The confidence level determination module 440 may use the received channel knowledge to form one or more channel knowledge metrics 404. A channel knowledge metric 404 may include one or more pieces of channel knowledge information. For example, a channel knowledge metric 404 may include a precoding vector 435 obtained via feedback 434 and the number of antennas used by the receiver 431 obtained via long term station observations 428. The confidence level 405 for each channel knowledge metric 404 may reflect the weight attached to each channel knowledge metric 404. For example, the channel part obtained from reciprocity may have a higher level of confidence than the quantized feedback of the receiver about the channel. Beamforming may take into account the confidence level 405 of a channel knowledge metric 404.

The transmitter 402 may include a transmitter knowledge of interference structure metric 406. The transmitter knowledge of interference structure metric 406 may be received from the receiver 109 via feedback 224. The wireless communication device 201b may compute the interference covariance matrix 114b, average it over time and/or frequency and send the long-term covariance matrix of interference 441 to the base station 201a. The wireless communication device 201b can also send eigen-directions 442 of the interference covariance matrix 114b to the base station 201a. Transmission of such feedback may be semi-static or event-triggered (e.g., only if the long-term covariance matrix of interference 441 has dominant eigen-directions, for example, if the long-term covariance matrix of interference 441 is a rank 1 interference matrix). Knowledge of the interference structure can also be based on communications between different base stations 201a. Different base stations 201a may inform each other of the precoding directions employed or the activity in their cell at different parts of the frequency band.

The transmitter 402 may include a beamforming module 403. The beamforming module 403 may receive the transmitter knowledge of interference structure metric 406 and the channel knowledge metrics 404 with corresponding confidence levels 405. The beamforming module 403 may include channel random values 443. The channel random values 443 may refer to random values assumed for part of the channel not observable by the transmitter 402. Channel random values 443 may be used for pseudo-eigen beamforming (PeB). PeB may be used for the transmission of multiple streams. In PeB, beams may be constructed based on the channel knowledge metrics 404 and the transmitter knowledge of interference structure metric 406. These beams may be constructed with known eigen-directions. These beams may also be constructed with other beam directions. Some parts of the channel may be neither observable nor estimable. These parts of the channel may be assigned random values. The beamforming may be done in such a way that the random values (and hence the random directions of the beams) are in the subspace orthogonal to the known eigen-directions 107 or other beam directions used. Different random beams may be chosen for different times (e.g., slots/sub-frames) and/or frequency (physical resource blocks (PRBs)) resources.

PeB may be used in scenarios where the knowledge of the channel at the transmitter 402 is not complete. For example, PeB may be used in time division duplexing (TDD) with "partial channel reciprocity." Partial channel reciprocity was discussed above in relation to FIG. 2. As another example, PeB may be used in scenarios where reduction in the amount of feedback 224 from the receiver 109 to the transmitter 402 is desired. PeB may also be used in scenarios where the information available from different sources about different parts of the channel has different confidence levels 405. One such scenario would be a TDD system with a significant calibration mismatch at the wireless communication device 201b. In this case, partial feedback 224 from the wireless communication device 201b may prove to be more reliable than channel knowledge metrics 404 obtained at the base station 201a due to sounding reference signal (SRS) transmission 438 in the uplink channel 218.

The channel random values 443 may be based on an assumed structure about the channel at the transmitter 404. The channel random values 443 may also be based on information obtained from higher layers. In one configuration, the channel random values 443 may be chosen from the probability distribution based on the long term covariance matrix obtained from different sources of information. The channel random values 443 may also be chosen based on the conditional probability distribution given the partial knowledge of the channel. Large antenna arrays with closely spaced antenna elements or with cross polarized antennas may require channel random values.

Long-term knowledge of the geometry of the antennas and the environment may be used to exploit the symmetries in the channel structure and form the joint probability distribution. In other words, when considering the channel correlations between all transmit antennas 215 and one receive antenna 216, if symmetry is assumed, the correlation structure is the same for all the receive antennas 216. So by obtaining this structure for only one receive antenna 216, the antenna structure for all the receive antennas 216 may be assumed. Similarly, the correlation structure between one transmit antenna 215 and all receive antennas 216 is going to be the same across all transmit antennas 215. The use of channel random values 443 may result in random beams. Random beams may be different across frequency and time to provide better diversity and/or more accurate rate prediction.

The beamforming module 403 may generate beamforming specifications 444 for the transmission antennas 115. The beamforming specifications 444 may be based on the channel knowledge metrics 404, the transmitter knowledge of interference structure metric 406, and the channel random values 443. The beamforming specifications 444 may include the antennas to transmit each signal stream layer 445 (i.e., which antennas 115 should transmit each signal layer), the weight assigned to each antenna 446, the weight assigned to each symbol of data streams 447, and beamforming directions 448. The beamforming directions 448 may take into account the confidence levels 405 of each channel knowledge metric 404. The beamforming directions 448 may also take into account the confidence levels of each transmitter knowledge of interference structure metric 406. Noise whitening and interference nulling may be considered only if the confidence is high.

As an example of PeB, a first wireless device 101a with M transmit antennas 115 may transmit to a second wireless device 101b with N receive antennas 116. The first wireless device 101a may have a channel knowledge metric 404 corresponding to only one of the receiving antennas 116 (through sounding reference signal (SRS) transmission 438). A transmission with n layers may be desired. It may also be assumed that the long term covariance matrix of the N by M channel is available. The long term covariance matrix is the covariance matrix of the channel or the whitened channel. Beams $v\_1, \ldots, v\_n$ may then be formed. The first channel $v\_1$ may be the normalized channel obtained from the sounding reference signal (SRS) transmission 438. The other channels $v\_2, \ldots, v\_n$ may be a set of random orthonormal directions in the subspace orthogonal to $v\_1$.

In generating the random directions, one can use the long term statistics of the channel to select random values from a conditional probability distribution based on the long term covariance matrix and the first channel $v\_1$. One way to generate the random directions is to first generate vectors $c\_2, \ldots, c\_n$ from the conditional probability distribution $P(h\_2, \ldots, h\_N | h\_1)$, where $h\_1$ represents the channel for the known receive antenna 116 and $h\_2, \ldots, h\_N$ are the channels for the other receive antennas 116. The conditional probability distribution may be obtained from the joint probability distribution $P(h\_1, \ldots, h\_N)$. The joint probability distribution may be represented as a Gaussian distribution with the long term available covariance matrix. Another way to generate the random directions is to use the unconditional probability distribution for $h\_2, \ldots, h\_N$. Having obtained $c\_2, \ldots, c\_N$, QR decomposition may be performed on the matrix formed by $h\_1, c\_2, \ldots, c\_N$ with this order to reflect the confidence level of each source.

In another example, a first wireless device 101a with eight transmit antennas 115 may transmit to a second wireless device 101b with two receive antennas 116. The first wireless device 101a may have knowledge of the channel to one of the receive antennas 116 through a sounding reference signal (SRS) transmission 438. The first wireless device 101a may also be provided with quantized channel information for the other receive antenna 116. The first wireless device 101a may use the eigenvectors corresponding to the channel to the two receive antennas 116 as the beam directions. Alternatively, the first wireless device 101a may form the beam directions by QR decomposition on the channel obtained from a sounding reference signal (SRS) transmission 438 and feedback 434. The ordering of the channels in QR decomposition may be based on the reliability of each source.

In a third example, a first wireless device 101a with eight transmit antennas 115 may transmit to a second wireless device 101b with four receive antennas 116. The first wireless device 101a may have knowledge of the channel to only one of the receive antennas 116. The second wireless device 101b may have provided the first wireless device 101a with channel feedback 434 from one of the unobserved receive antennas 116 at the second wireless device 101b. It may also be assumed that the transmit antennas 115 are closely spaced linear antennas. In closely spaced linear antennas, the correlation between two antenna elements i and j is a distance dependent parameter of the form $\rho^{(i-j)}$ where $\rho$ is the correlation parameter dependent on distance. PeB with possibly rank 4 may be performed in three possible ways for this example.

In a first method, the first wireless device 101a may find the eigenvectors of the partial channel based on a sounding reference signal (SRS) transmission 438 and feedback 434 from the second wireless device 101b. The first wireless device 101a may use the sounding reference signal (SRS) transmission 438 and the feedback 434 as two of the eigen-directions. Then, the first wireless device 101a may select two other directions randomly based on a probability distribution with covariance matrix given the partial channel observation. In this case, the first wireless device 101a may transmit in the directions of the channel to the receiver antenna 116 whose channel knowledge is known and along random beam directions orthogonal to the former directions.

In a second method, the first wireless device 101a may assume the channel obtained from the sounding reference signal (SRS) 438 is one eigen-direction. The first wireless device 101a may perform some orthogonalization transformation like householder or QR decomposition to find the second eigen-direction based on the projection of the channel obtained from the feedback 434 on the orthogonal subspace of the first direction. QR transformation and eigen-value decomposition are examples of transforms that can be used to form beams within each group and across groups. The remaining two beam directions may then be chosen in a random manner similar to that of the first method. The second method may be useful if the channel obtained from feedback 434 is not as reliable (or complete) as the channel obtained by the sounding reference signal (SRS) 438.

In a third method, the channel direction obtained by feedback 434 may be used as the first eigen-direction. The second eigen-direction may be selected by projection of the sounding reference signal (SRS) 438 channel on the subspace orthogonal to the first eigen-direction. The third method may be useful when the channel obtained from a sounding reference signal (SRS) transmission 438 is not as reliable as the channel obtained from feedback 434.

Figure 5:
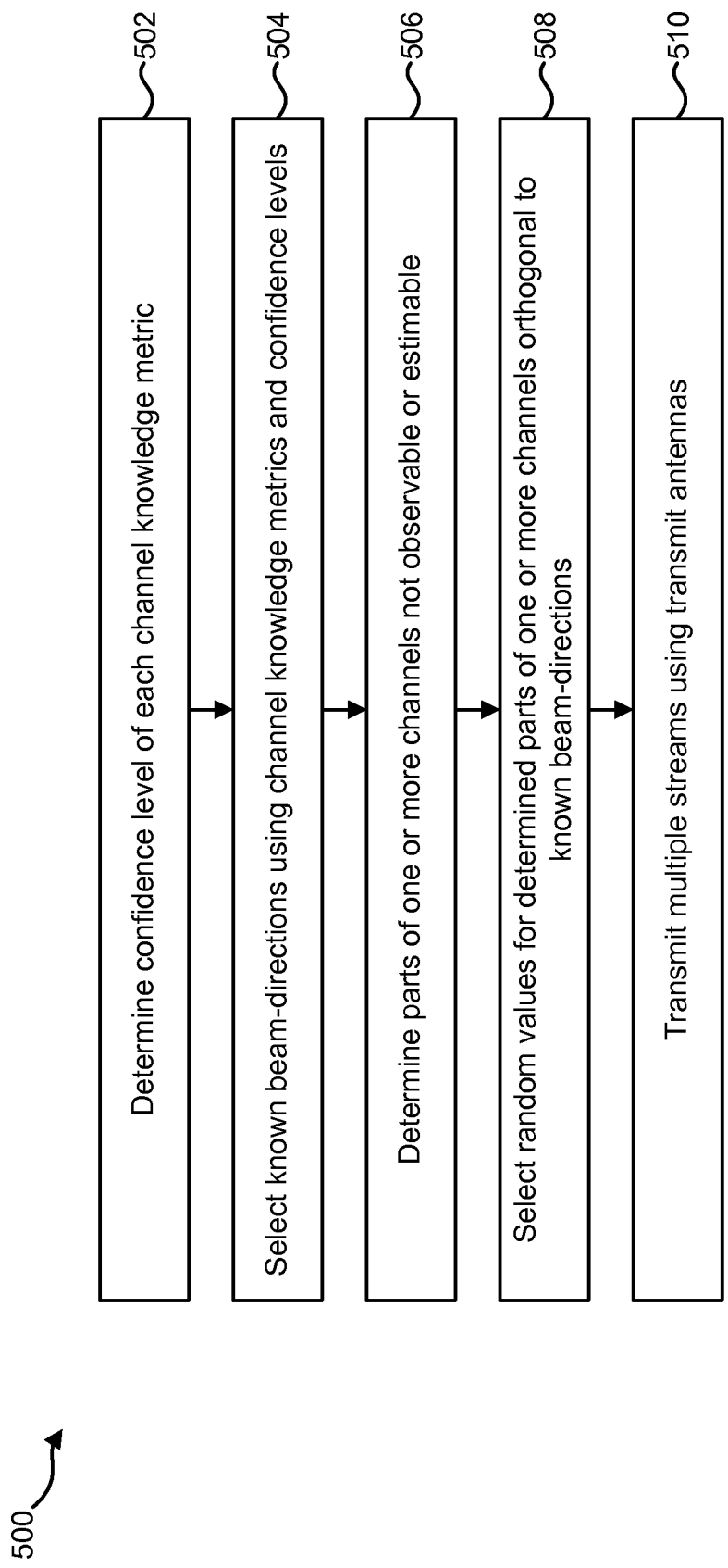
FIG. 5 is a flow diagram of a method for pseudo-eigen beamforming.

FIG. 5 is a flow diagram of a method 500 for pseudo-eigen beamforming. The method 500 may be performed by a transmitter 102. The transmitter 102 may determine 502 the confidence level 105 of each channel knowledge metric 104. As discussed above in relation to FIG. 4, the channel knowledge metrics 104 may be obtained from a variety of sources. The transmitter 102 may then select 504 known beam directions 107 using the channel knowledge metrics 104 and the confidence levels 105. The known beam directions 107 may correspond to the channels the transmitter 102 has knowledge of.

The transmitter 102 may determine 506 parts of one or more channels that are not observable or estimable. The transmitter 102 may not have enough channel knowledge for these channels or the confidence level 105 for channel knowledge metrics 104 corresponding to these channels may be too low. The transmitter 102 may select 508 random values 443 for the determined parts of the one or more channels. The random values 443 may be orthogonal to the known beam directions 107. The transmitter 102 may then transmit 510 multiple streams using the transmit antennas 115.

Figure 6:
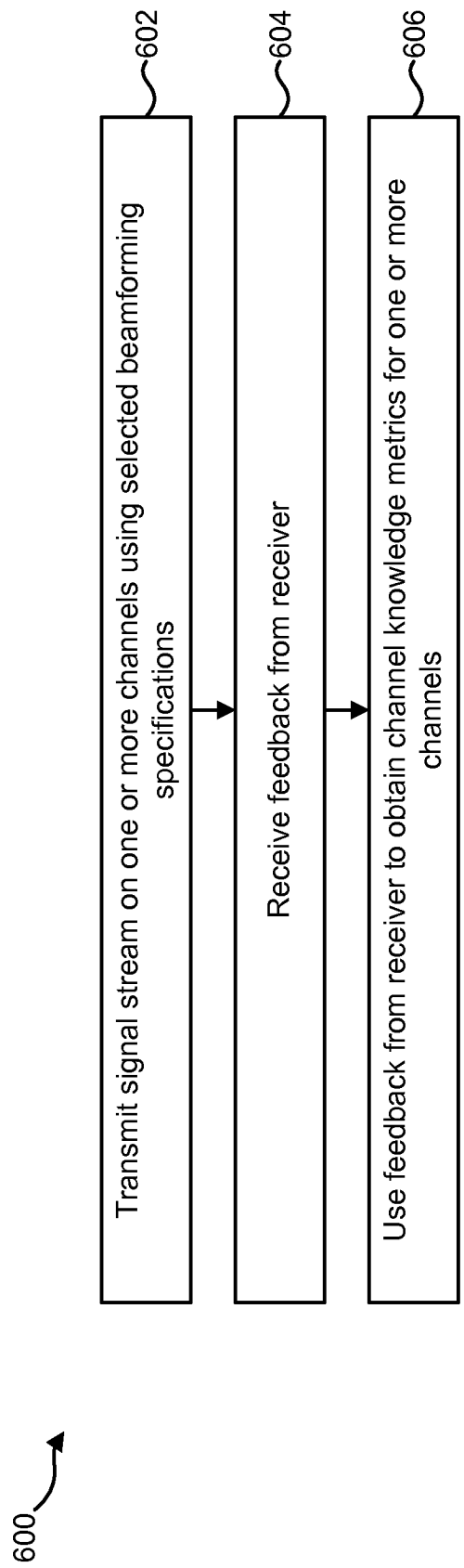
FIG. 6 is a flow diagram of a method for obtaining channel knowledge using feedback.

FIG. 6 is a flow diagram of a method 600 for obtaining channel knowledge using feedback 224. The method 600 may be performed by a transmitter 102. The transmitter 102 may transmit 602 a signal stream on one or more channels using selected beamforming specifications 444. The transmitter 102 may then receive 604 feedback 224 from a receiver 109. The feedback 224 may include channel estimates 225 observed or measured by the receiver 109. The transmitter 102 may use 606 the feedback 224 from the receiver 109 to obtain channel knowledge metrics 104 for one or more channels.

Figure 7:
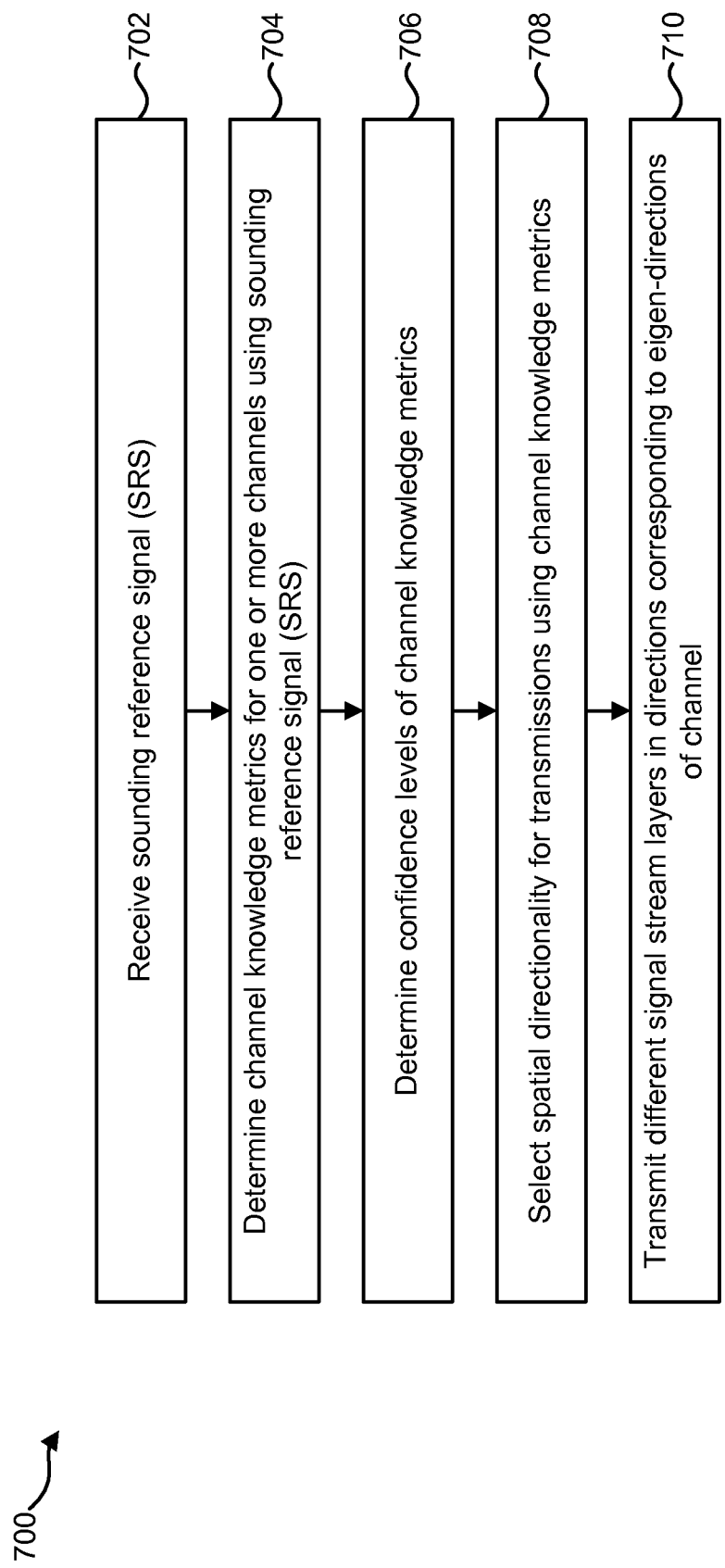
FIG. 7 is a flow diagram of a method for obtaining channel knowledge using a sounding reference signal (SRS)

FIG. 7 is a flow diagram of a method 700 for obtaining channel knowledge using a sounding reference signal (SRS) 226. The method 700 may be performed by a transmitter 102. The transmitter 102 may receive 702 a sounding reference signal (SRS) 226 from a receiver 109. The transmitter 102 may then determine 704 channel knowledge metrics 104 for one or more channels using the sounding reference signal (SRS) 226. The transmitter 102 may next determine 706 the confidence levels 105 of the channel knowledge metrics 104. The transmitter 102 may select 708 the spatial directionality for transmissions using the channel knowledge metrics 104. The transmitter 102 may then transmit 710 different signal stream layers in directions corresponding to the eigen-directions of the channel.

Figure 8:
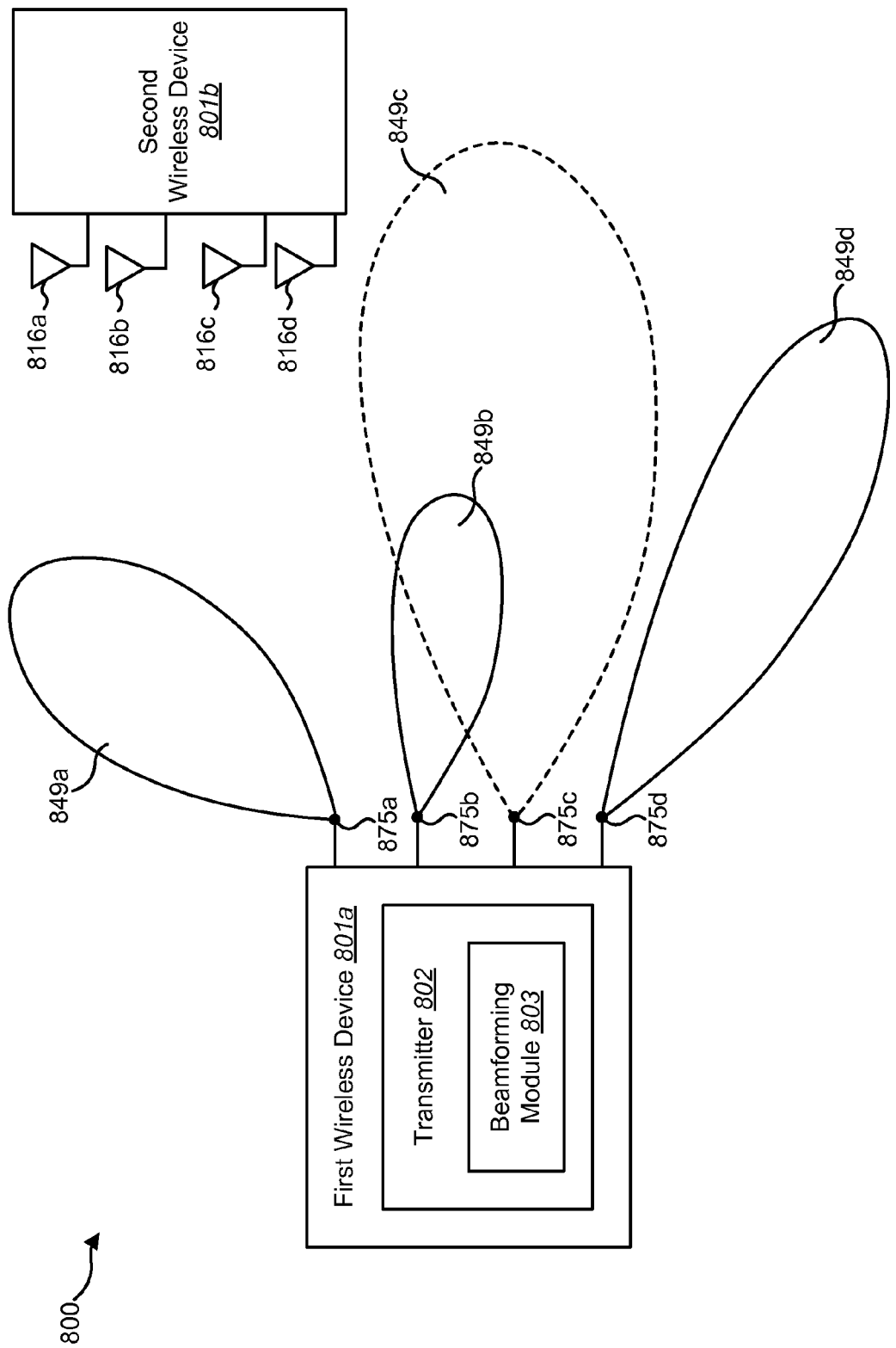
FIG. 8 is a block diagram illustrating beamforming for use in the present systems and methods.

FIG. 8 is a block diagram illustrating beamforming in a wireless communication system 800. A first wireless device 801a may send transmissions to a second wireless device 801b. The first wireless device 801a may include a transmitter 802. The transmitter 802 may include a beamforming module 803. The beamforming module 803 may determine the eigen-directions of transmissions from the first wireless device 801a to the second wireless device 801b. In one configuration, the first wireless device 801a may include four virtual antennas 875a-d and the second wireless device 801b may include four receive antennas 816a-d. Each of the virtual antennas 875a-d may generate a separate beam 849a-d using one or more transmit antennas 115 and weights/phases associated with each of the transmit antennas 115. The beams 849a-d may not accurately represent the channel between the first wireless device 801a and the second wireless device 801b. Thus, transmissions between the first wireless device 801a and the second wireless device 801b may be inefficient.

Figure 9:
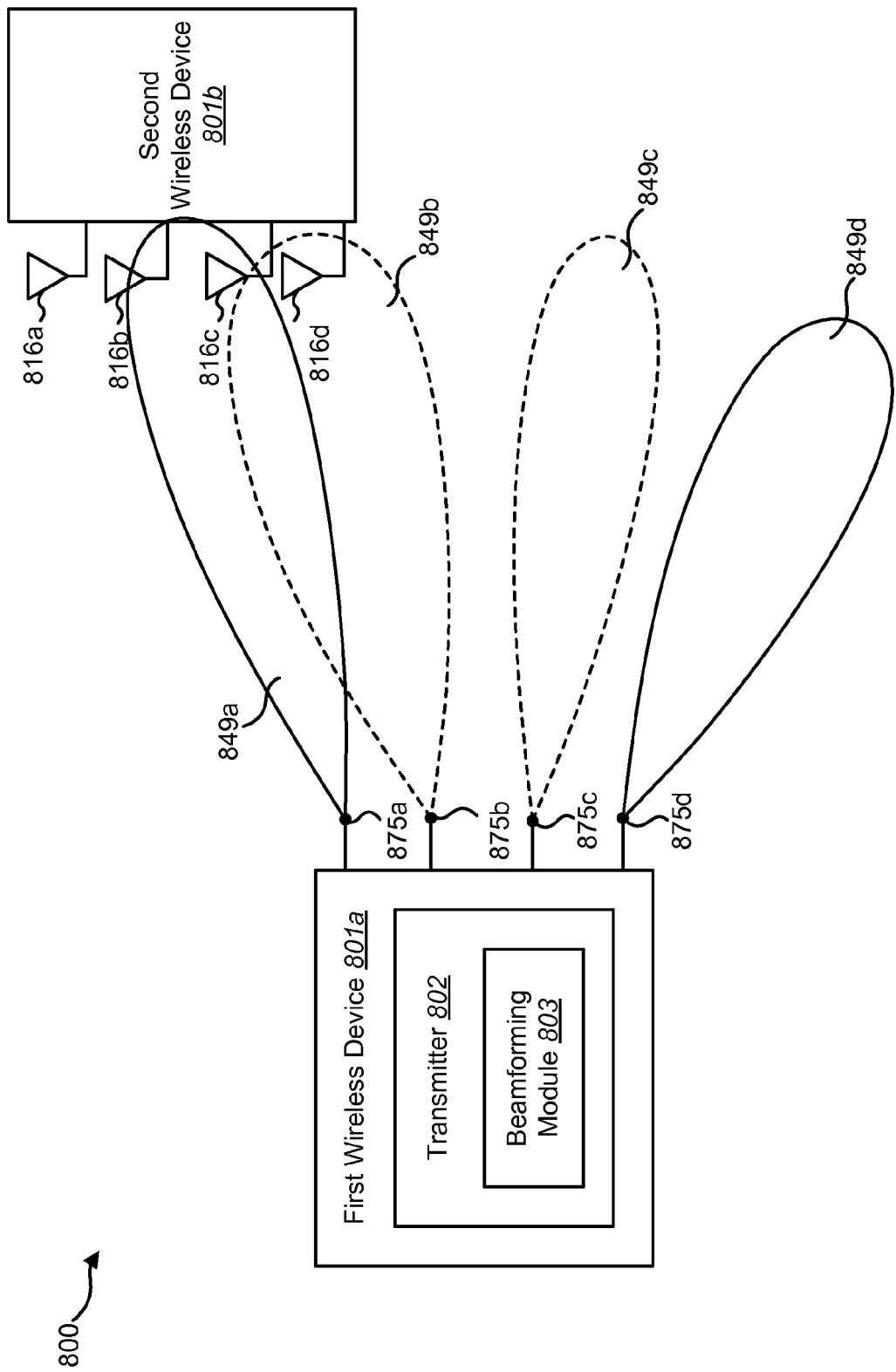
FIG. 9 is a block diagram illustrating additional beamforming in the wireless communication system.

FIG. 9 is a block diagram illustrating additional beamforming in the wireless communication system 800. The wireless communication system 800 of FIG. 9 is the same as the wireless communication system 800 of FIG. 8. The first wireless device 801a and the second wireless device 801b of FIG. 9 are the same as the first wireless device 801a and the second wireless device 801b of FIG. 8. Due to knowledge of the channel between the first wireless device 801a and the second wireless device 801b (i.e., channel knowledge metrics 104), the first wireless device 801a may adjust the beamforming specifications 444 applied to some of the virtual antennas 875. In this configuration, the beamforming of the first virtual antenna 875a and the beamforming of the second virtual antenna 875b have been adjusted based on the channel between the first wireless device 801a and the second wireless device 801b. Random values 443 have been assigned to the eigen-directions of the third virtual antenna 875c and the fourth virtual antenna 875d.

Figure 10:
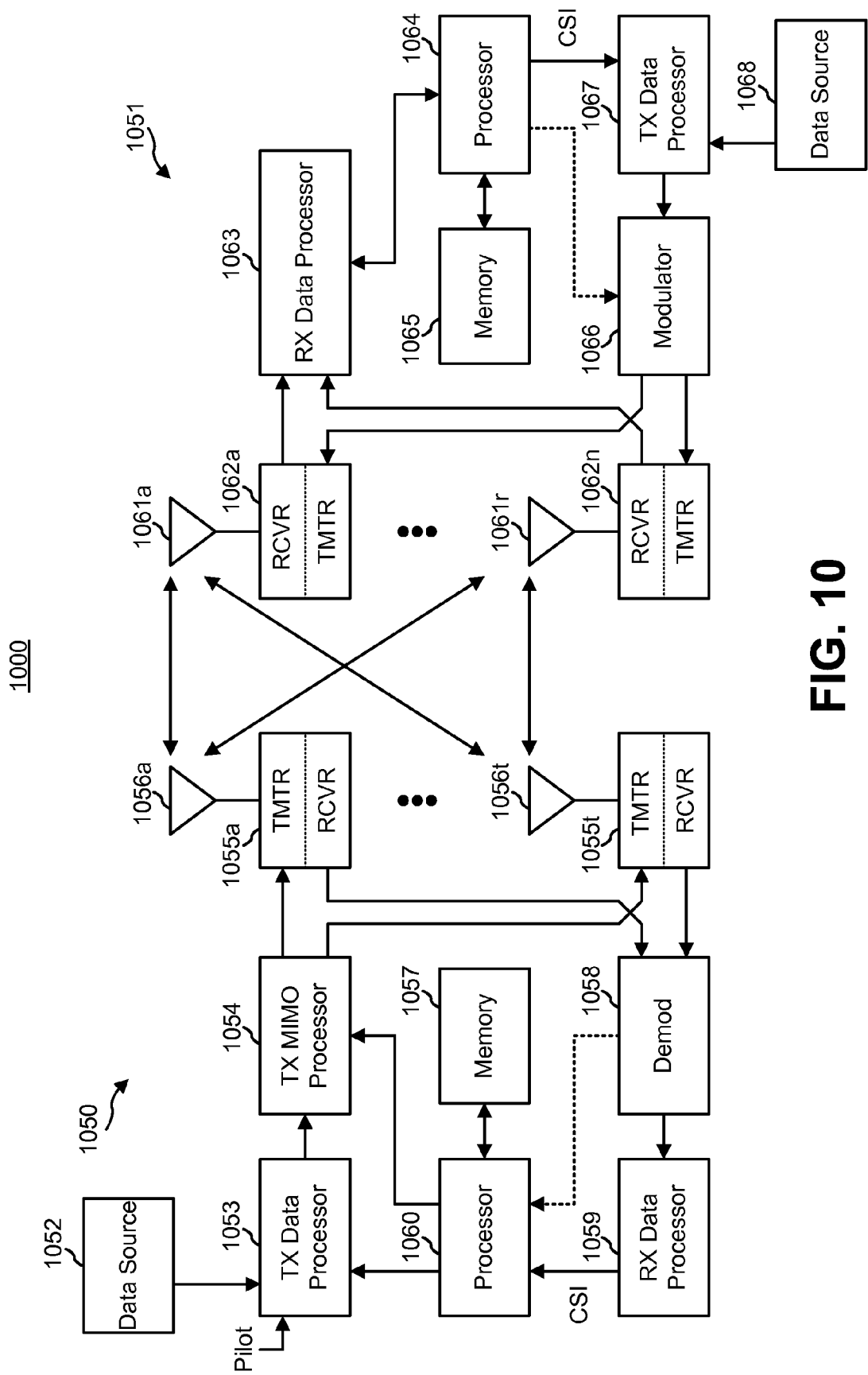
FIG. 10 is a block diagram of a transmitter and receiver in a multiple-input and multiple-output (MIMO) system.

FIG. 10 is a block diagram of a transmitter 1050 and receiver 1051 in a multiple-input and multiple-output (MIMO) system 1000. In the transmitter 1050, traffic data for a number of data streams is provided from a data source 1052 to a transmit (Tx) data processor 1053. Each data stream may then be transmitted over a respective transmit antenna 1056a-t. The transmit (Tx) data processor 1053 may format, code, and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 1051 to estimate the channel response. The multiplexed pilot and coded data for each stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by a processor.

The modulation symbols for all data streams may be provided to a transmit (TX) multiple-input multiple-output (MIMO) processor 1054, which may further process the modulation symbols (e.g., for OFDM). The transmit (TX) multiple-input multiple-output (MIMO) processor 1054 then provides NT modulation symbol streams to NT transmitters (TMTR) 1055a through 1055t. The TX transmit (TX) multiple-input multiple-output (MIMO) processor 1054 may apply beamforming weights to the symbols of the data streams and to the antenna 1056 from which the symbol is being transmitted.

Each transmitter 1055 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 1055a through 1055t are then transmitted from NT antennas 1056a through 1056t, respectively.

At the receiver 1051, the transmitted modulated signals are received by NR antennas 1061a through 1061r and the received signal from each antenna 1061 is provided to a respective receiver (RCVR) 1062a through 1062r. Each receiver 1062 may condition (e.g., filter, amplify, and down-convert) a respective received signal, digitize the conditioned signal to provide samples, and further process the samples to provide a corresponding "received" symbol stream.

An RX data processor 1063 then receives and processes the NR received symbol streams from NR receivers 1062 based on a particular receiver processing technique to provide NT "detected" symbol streams. The RX data processor 1063 then demodulates, deinterleaves, and decodes each detected symbol stream to recover the traffic data for the data stream. The processing by RX data processor 1063 is complementary to that performed by TX MIMO processor 1054 and TX data processor 1053 at transmitter system 1050.

A processor 1064 may periodically determine which precoding matrix to use. The processor 1064 may store information on and retrieve information from memory 1065. The processor 1064 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1067, which also receives traffic data for a number of data streams from a data source 1068, modulated by a modulator 1066, conditioned by transmitters 1062a through 1062r, and transmitted back to the transmitter 1050.

At the transmitter 1050, the modulated signals from the receiver are received by antennas 1056, conditioned by receivers 1055, demodulated by a demodulator 1058, and processed by an RX data processor 1059 to extract the reverse link message transmitted by the receiver system 1051. A processor 1060 may receive channel state information (CSI) from the RX data processor 1059. The processor 1060 may store information on and retrieve information from memory 1057. Processor 1060 then determines which pre-coding matrix to use for determining the beamforming weights then processes the extracted message.

Figure 11:
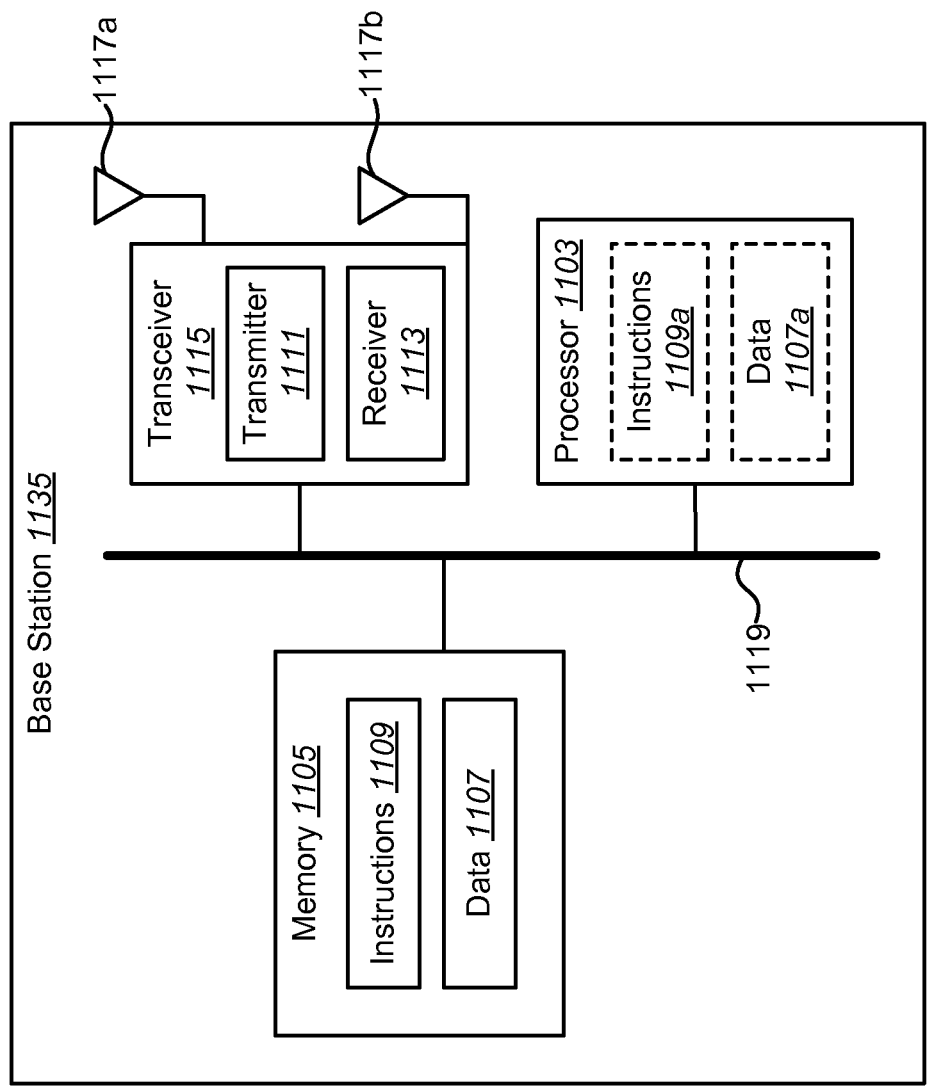
FIG. 11 illustrates certain components that may be included within a base station that is configured in accordance with the present disclosure.

FIG. 11 illustrates certain components that may be included within a base station 1135. A base station 1135 may also be referred to as, and may include some or all of the functionality of, an access point, a broadcast transmitter, a Node B, an evolved Node B, etc. The base station 1135 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1135 of FIG. 11, in an alternative configuration, a combination of processors (e.g., an ARM and DSP) could be used.

The base station 1135 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The base station 1135 may also include a transmitter 1111 and a receiver 1113 to allow transmission and reception of signals to and from the base station 1135. The transmitter 1111 and receiver 1113 may be collectively referred to as a transceiver 1115. A first antenna 1117a and a second antenna 1117b may be electrically coupled to the transceiver 1115. The base station 1135 may also include (not shown) multiple transmitters, multiple receivers, multiple transceivers and/or additional antennas.

The various components of the base station 1135 may be coupled together by one or more buses, which may include a power bus, a control signal bus, a status signal bus, a data bus, etc. For the sake of clarity, the various buses are illustrated in FIG. 11 as a bus system 1119.

Figure 12:
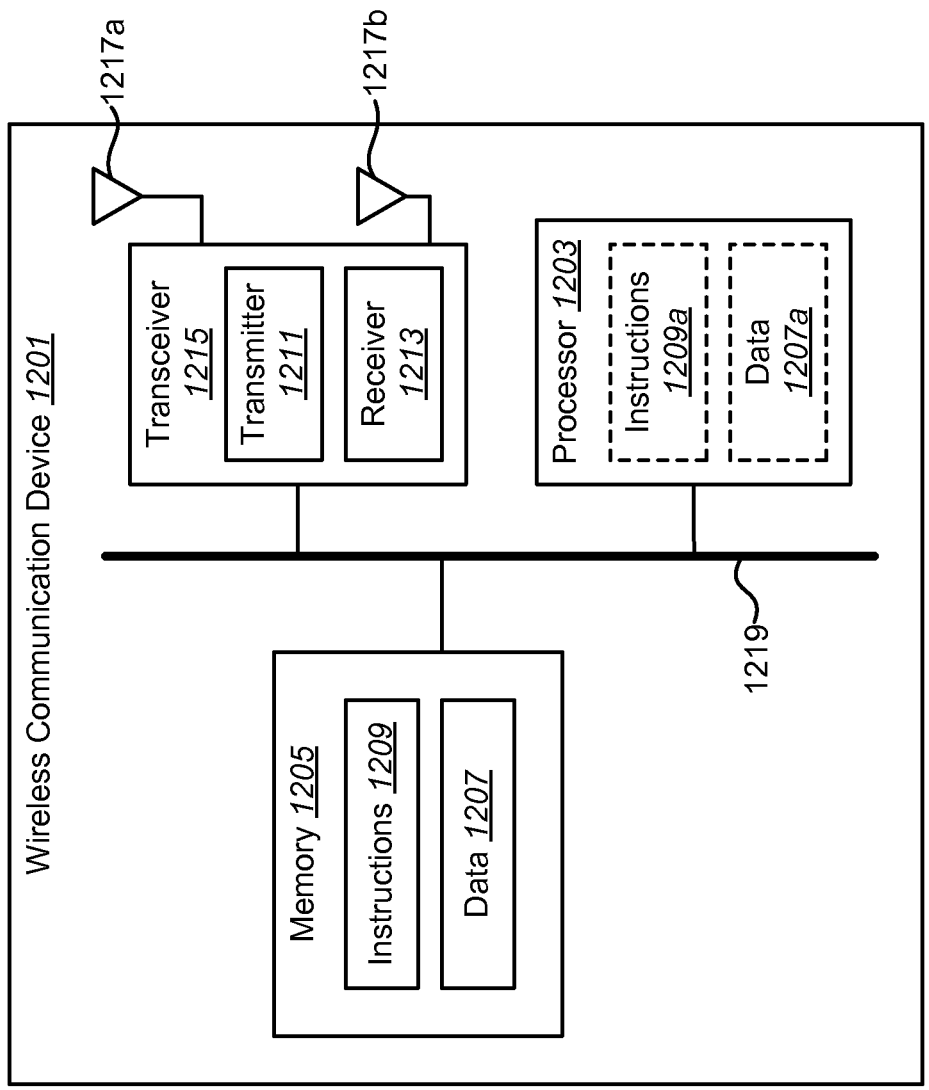
FIG. 12 illustrates certain components that may be included within a wireless communication device that is configured in accordance with the present disclosure.

FIG. 12 illustrates certain components that may be included within a wireless communication device 1201. The wireless communication device 1201 may be an access terminal, a mobile station, a user equipment (UE), etc. The wireless communication device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless communication device 1201 of FIG. 12, in an alternative configuration, a combination of processors (e.g., an ARM and DSP) could be used.

The wireless communication device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The wireless communication device 1201 may also include a transmitter 1211 and a receiver 1213 to allow transmission and reception of signals to and from the wireless communication device 1201. The transmitter 1211 and receiver 1213 may be collectively referred to as a transceiver 1215. A first antenna 1217a and a second antenna 1217b may be electrically coupled to the transceiver 1215. The wireless communication device 1201 may also include (not shown) multiple transmitters, multiple receivers, multiple transceivers and/or additional antennas.

The various components of the wireless communication device 1201 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3 and 5-7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for transmission beamforming, the method comprising:
   obtaining one or more channel knowledge metrics for one or more channels;
   determining a confidence level of each channel knowledge metric;
   selecting beamforming specifications based on the channel knowledge metrics and the confidence levels;
   transmitting a signal stream on the one or more channels using the selected beamforming specifications; and
   selecting one or more known eigen-directions using the one or more channel knowledge metrics and the confidence levels;
   determining parts of the one or more channels not observable or estimable; and
   selecting random values for the determined parts, wherein the random values selected are orthogonal to the known eigen-directions.

2. The method of claim 1, wherein the eigen-directions and the random values are the beamforming specifications.

3. The method of claim 1, wherein the random values are selected using a conditional probability distribution and a joint probability distribution.

4. The method of claim 1, wherein transmitting the signal stream comprises transmitting different signal stream layers in directions corresponding to the known eigen-direction and the random values.

5. The method of claim 1, wherein obtaining the one or more channel knowledge metrics comprises:
   receiving feedback from a receiver; and
   using the feedback to obtain the one or more channel knowledge metrics.

6. The method of claim 5, wherein the feedback comprises one or more precoding vectors.

7. The method of claim 5, wherein the feedback comprises a quantized version of a channel covariance matrix.

8. The method of claim 5, wherein the feedback comprises a quantized version of an interference covariance matrix.

9. The method of claim 5, wherein the feedback comprises eigen-directions of a whitened channel, wherein the eigen-direction are computed using interference.

10. The method of claim 5, wherein the feedback comprises channel quality indicators (CQI) and rank based on a pseudo eigen-beamforming operation synchronized between a base station and a wireless communication device.

11. The method of claim 5, wherein the feedback comprises channel quality indicators (CQI) and rank based on a pseudo eigen-beamforming operation with random beamforming that is not known by a base station, and wherein the base station transmits along a set of random beams in the orthogonal space of known directions using the CQI and rank recommended.

12. The method of claim 1, wherein the one or more channel knowledge metrics are obtained using long term static observations.

13. The method of claim 12, wherein the long term static observations comprise at least one of a number of transmit antennas used, an antenna spacing on a transmitter, a number of receive antennas used, an antenna spacing on a receiver, and a type of antenna used.

14. The method of claim 1, wherein the one or more channel knowledge metrics are obtained using receiver-to-transmitter traffic.

15. The method of claim 14, wherein the receiver-to-transmitter traffic comprises sounding reference signal (SRS) transmissions.

16. The method of claim 1, further comprising selecting the beamforming specifications using a transmitter knowledge of interference structure metric.

17. The method of claim 16, wherein the transmitter knowledge of interference structure metric comprises a long term covariance matrix of interference.

18. The method of claim 16, wherein the transmitter knowledge of interference structure metric comprises dominant eigen-directions of interference.

19. The method of claim 1, wherein obtaining the one or more channel knowledge metrics comprises:
receiving a sounding reference signal (SRS) from a receiver; and
determining one or more channel knowledge metrics using the SRS.

20. The method of claim 1, wherein the beamforming specifications comprises a group or groups of antennas to use for transmitting the signal stream.

21. The method of claim 1, wherein the beamforming specifications comprises weights assigned to one or more transmit antennas used for transmitting the signal stream.

22. The method of claim 1, wherein the beamforming specifications comprises weights assigned to each symbol of the signal stream.

23. The method of claim 1, wherein the method is performed by a wireless device.

24. The method of claim 23, wherein the wireless device is a base station.

25. The method of claim 23, wherein the wireless device is a wireless communication device.

26. The method of claim 23, wherein the wireless device is configured to operate in a multiple-input and multiple-output (MIMO) wireless communication system.

27. A wireless device configured for transmission beamforming, comprising:
a processor;
memory in electronic communication with the processor;
instructions stored in the memory, the instructions being executable by the processor to:
obtain one or more channel knowledge metrics for one or more channels;
determine a confidence level of each channel knowledge metric;
select beamforming specifications based on the channel knowledge metrics and the confidence levels;
transmit a signal stream on the one or more channels using the selected beamforming specifications;
select one or more known eigen-directions using the one or more channel knowledge metrics and the confidence levels;
determine parts of the one or more channels not observable or estimable; and
select random values for the determined parts, wherein the random values selected are orthogonal to the known eigen-directions.

28. The wireless device of claim 27, wherein the eigen-directions and the random values are the beamforming specifications.

29. The wireless device of claim 27, wherein the random values are selected using a conditional probability distribution and a joint probability distribution.

30. The wireless device of claim 27, wherein transmitting the signal stream comprises transmitting different signal stream layers in directions corresponding to the known eigen-direction and the random values.

31. The wireless device of claim 27, wherein obtaining the one or more channel knowledge metrics comprises:
receiving feedback from a receiver; and
using the feedback to obtain the one or more channel knowledge metrics.

32. The wireless device of claim 31, wherein the feedback comprises one or more precoding vectors.

33. The wireless device of claim 31, wherein the feedback comprises a quantized version of a channel covariance matrix.

34. The wireless device of claim 31, wherein the feedback comprises a quantized version of an interference covariance matrix.

35. The wireless device of claim 31, wherein the feedback comprises eigen-directions of a whitened channel, wherein the eigen-direction are computed using interference.

36. The wireless device of claim 31, wherein the feedback comprises channel quality indicators (CQI) and rank based on a pseudo eigen-beamforming operation synchronized between a base station and a wireless communication device.

37. The wireless device of claim 31, wherein the feedback comprises channel quality indicators (CQI) and rank based on a pseudo eigen-beamforming operation with random beamforming that is not known by a base station, and wherein the base station transmits along a set of random beams in the orthogonal space of known directions using the CQI and rank recommended.

38. The wireless device of claim 27, wherein the one or more channel knowledge metrics are obtained using long term static observations.

39. The wireless device of claim 38, wherein the long term static observations comprise at least one of a number of transmit antennas used, an antenna spacing on a transmitter, a number of receive antennas used, an antenna spacing on a receiver, and a type of antenna used.

40. The wireless device of claim 27, wherein the one or more channel knowledge metrics are obtained using receiver-to-transmitter traffic.

41. The wireless device of claim 40, wherein the receiver-to-transmitter traffic comprises sounding reference signal (SRS) transmissions.

42. The wireless device of claim 27, wherein the instructions are further executable to select beamforming specifications using a transmitter knowledge of interference structure metric.

43. The wireless device of claim 42, wherein the transmitter knowledge of interference structure metric comprises a long term covariance matrix of interference.

44. The wireless device of claim 42, wherein the transmitter knowledge of interference structure metric comprises dominant eigen-directions of interference.

45. The wireless device of claim 27, wherein obtaining one or more channel knowledge metrics comprises:

receiving a sounding reference signal (SRS) from a receiver; and determining one or more channel knowledge metrics using the SRS.

46. The wireless device of claim 27, wherein the beamforming specifications comprises a group or groups of antennas to use for transmitting the signal stream.

47. The wireless device of claim 27, wherein the beamforming specifications comprises weights assigned to one or more transmit antennas used for transmitting the signal stream.

48. The wireless device of claim 27, wherein the beamforming specifications comprises weights assigned to each symbol of the signal stream.

49. The wireless device of claim 27, wherein the wireless device is a base station.

50. The wireless device of claim 27, wherein the wireless device is a wireless communication device.

51. The wireless device of claim 27, wherein the wireless device is configured to operate in a multiple-input and multiple-output (MIMO) wireless communication system.

52. A wireless device configured for transmission beamforming, comprising:

means for obtaining one or more channel knowledge metrics for one or more channels;

means for determining a confidence level of each channel knowledge metric;

means for selecting beamforming specifications based on the channel knowledge metrics and the confidence levels;

means for transmitting a signal stream on the one or more channels using the selected beamforming specifications;

means for selecting one or more known eigen-directions using the one or more channel knowledge metrics and the confidence levels;

means for determining parts of the one or more channels not observable or estimable; and means for selecting random values for the determined parts, wherein the random values selected are orthogonal to the known eigen-directions.

53. A computer-program product for a wireless device configured for transmission beamforming, the computer-program product comprising a computer-readable medium having instructions thereon, the instructions comprising:

code for obtaining one or more channel knowledge metrics for one or more channels;

code for determining a confidence level of each channel knowledge metric;

code for selecting beamforming specifications based on the channel knowledge metrics and the confidence levels;

code for transmitting a signal stream on the one or more channels using the selected beamforming specifications;

code for selecting one or more known eigen-directions using the one or more channel knowledge metrics and the confidence levels;

code for determining parts of the one or more channels not observable or estimable; and code selecting random values for the determined parts, wherein the random values selected are orthogonal to the known eigen-directions.

* * * * *